(12) United States Patent
Chon et al.

(10) Patent No.: US 8,795,614 B2
(45) Date of Patent: *Aug. 5, 2014

(54) METHOD FOR ECONOMICAL EXTRACTION OF MAGNESIUM, BORON AND CALCIUM FROM LITHIUM BEARING SOLUTION

(71) Applicant: Research Institute of Industrial Science & Technology, Pohang (KR)

(72) Inventors: Uong Chon, Pohang-si (KR); Gi Chun Han, Cheongju-si (KR); Ki Hong Kim, Pohang-si (KR); Chang Ho Song, Incheon (KR); Ki Young Kim, Yongin-si (KR)

(73) Assignee: Research Institute of Industrial Science & Technology, Pohang (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/736,133

(22) Filed: Jan. 8, 2013

(65) Prior Publication Data

US 2013/0121899 A1  May 16, 2013

Related U.S. Application Data

(63) Continuation of application No. PCT/KR2011/005030, filed on Jul. 8, 2011.

(30) Foreign Application Priority Data

Jul. 9, 2010  (KR) .................. 10-2010-0066390
Dec. 7, 2010  (KR) .................. 10-2010-0124088

(51) Int. Cl.
*C01D 15/00*  (2006.01)
*C22B 3/44*  (2006.01)
*C22B 26/12*  (2006.01)

(52) U.S. Cl.
CPC .. *C22B 26/12* (2013.01); *C22B 3/44* (2013.01)
USPC .......... 423/164; 423/165; 423/179.5; 423/276

(58) Field of Classification Search
USPC ............................... 423/164, 165, 179.5, 276
See application file for complete search history.

(56) References Cited

U.S. PATENT DOCUMENTS

| 4,261,960 | A | 4/1981 | Boryta | |
|---|---|---|---|---|
| 5,219,550 | A | 6/1993 | Brown | |
| 6,207,126 | B1 | 3/2001 | Boryta | |
| 2011/0044882 | A1* | 2/2011 | Buckley et al. | 423/481 |
| 2011/0300041 | A1* | 12/2011 | Galli et al. | 423/179.5 |
| 2013/0146476 | A1* | 6/2013 | Chon et al. | 205/770 |

FOREIGN PATENT DOCUMENTS

WO  2010/006366  1/2010

* cited by examiner

*Primary Examiner* — Steven Bos
(74) *Attorney, Agent, or Firm* — Lexyoume IP Meister, PLLC (57) ABSTRACT

The present invention relates to a method of economical extraction of magnesium, boron and calcium, while minimizing the loss of lithium, from a lithium bearing solution. More specifically, the present invention provides a method for economical extraction of magnesium, boron, and calcium, while minimizing the loss of lithium, from a lithium bearing solution comprising the steps of: (a) adding an alkali in the lithium bearing solution to precipitate magnesium hydroxide; (b) absorbing boron ions on the surface of the magnesium hydroxide by adjusting the pH to about 8.5 to about 10.5; and (c) simultaneously extracting magnesium and boron by filtering the magnesium hydroxide absorbed with the boron ions from the lithium bearing solution.

8 Claims, 6 Drawing Sheets

| Step (a) | Precipitating Magnesium Hydroxide from Magnesium |

↓

| Step (b) | Absorbing Boron Ions on Surface of Magnesium Hydroxide |

↓

| Step (c) | Simultaneously Extracting Magnesium and Boron upon Filtering Magnesium Hydroxide Absorbed with Boron Ions |

↓

| Step (d) | Precipitating Calcium Hydroxide or Calcium Carbonate from Calcium |

METHOD FOR ECONOMICAL EXTRACTION OF MAGNESIUM, BORON AND CALCIUM FROM LITHIUM BEARING SOLUTION

CROSS-REFERENCE TO RELATED APPLICATIONS

This application is a continuation of pending International Application No. PCT/KR2011/005030 filed on Jul. 8, 2011, which claims priority to Korean Patent Application No. 10-2010-0066390, filed on Jul. 9, 2010, and Korean Patent Application No. 10-2010-0124088, filed on Dec. 7, 2010, the entire contents of each which are incorporated herein by reference.

FIELD OF THE INVENTION

According to one embodiment of the present invention, a method of extracting magnesium, boron and calcium included in a lithium bearing solution to produce a high purity lithium compound is provided. The method minimizes the lithium loss from the lithium bearing solution and allows effective utilization of the extracted magnesium, boron and calcium.

BACKGROUND OF THE INVENTION

The application of lithium currently extends to diverse industries, including the rechargeable battery, glass, ceramic, alloy, lubricant, and pharmaceutical industries. The lithium rechargeable battery has recently been receiving attention as a main power source for hybrid and electric cars, and the market for lithium rechargeable batteries for cars is expected to continue growing to approximately one-hundred times the conventional compact battery markets for cell phones and notebooks.

In addition, a global movement towards more stringent environmental regulations is likely to expand the application of lithium to not only the hybrid and electric car industries, but to the electrical, chemical and energy fields as well. Thus, a dramatic increase of both domestic and foreign demand for lithium is expected.

Some notable main sources for the lithium could be brine containing lithium produced in nature, and a lithium bearing solution supplied from minerals possessing lithium. Such lithium bearing solution, however, contains a substantial amount of impurities, including magnesium, boron and calcium. The extraction of the impurities in advance is considered to be a critical process in order to obtain high purity lithium necessary for preparing a lithium rechargeable battery.

Conventionally, after absorbed on a boron-selective ion exchange resin containing a N-methylglucamine functional group, the boron ions included in a lithium bearing solution are extracted by washing with an acid solution for desorption. The magnesium and calcium ions included in the lithium bearing solution are extracted by adding alkali and precipitating in the form of magnesium hydroxide and calcium hydroxide.

Such method, however, is not suitable for extracting the boron from the lithium bearing solution, because a relatively expensive ion-exchange resin and usage of a variety of chemicals (e.g., substantial amounts of an acid and a base) in the management of the boron-extracting process are required. Further, the loss of lithium is likely to be substantial because the addition of excessive alkali elevates the pH of the lithium bearing solution, which, in turn, causes a negative charge to be built up on the surface of the precipitated magnesium hydroxide and calcium hydroxide, and thus the absorption of positive lithium ions. As a result, the extraction of lithium along with the impurities cannot be avoided.

U.S. Pat. No. 5,219,550 describes a method of eliminating impurities by extracting magnesium and calcium from the brine after the extraction of boron in an organic phase by mixing an organic solvent with lithium bearing brine at a volume ratio from 1:1 to 5:1. This complicated process, however, has some drawbacks, namely environmental pollution caused by using the organic solvent and a substantial loss of lithium due to the uncontrolled pH.

SUMMARY OF THE INVENTION

In accordance with an embodiment of the present invention, a method of economical extraction of magnesium, boron, and calcium from a lithium bearing solution, while minimizing the loss of lithium, to produce a high purity lithium compound is provided.

In accordance with an embodiment of the present invention, it is provided a method for economical extraction of magnesium, boron, and calcium included in a lithium bearing solution comprising the steps of: (a) adding an alkali to the lithium bearing solution to precipitate magnesium hydroxide; (b) absorbing boron ions onto the surface of the magnesium hydroxide by adjusting the pH to about 8.5 to about 10.5; and (c) simultaneously extracting magnesium and boron by filtering the magnesium hydroxide having the absorbed boron ions from the lithium bearing solution.

In one embodiment of the present invention, the method may further comprise a step of (d) precipitating calcium hydroxide or calcium carbonate by adding an alkali or a carbonate or a mixture thereof to the lithium bearing solution from which magnesium and boron are extracted.

In one embodiment of the present invention, the steps from (a) to (c) may be repeated at least twice.

In one embodiment of the present invention, the step (b) may involve minimizing the loss of lithium by positively charging the surface charge of the magnesium hydroxide, which allows the absorbance of boron ions having a negative charge to the surface of magnesium hydroxide to prevent the absorbance of positively charged lithium ions.

In one embodiment of the present invention, the alkali added to the step (a) or step (d) may be one selected from the group consisting of NaOH, $Ca(OH)_2$, $NH_4OH$, $R_4NOH \cdot 5H_2O$ and a mixture thereof, wherein R is independently a C1-C10 alkyl group.

In another embodiment of the present invention, the carbonate added in the step (d) may be one selected from the group consisting of $Na_2CO_3$, $K_2CO_3$, and a mixture thereof.

In another embodiment of the present invention, the pH of the lithium bearing solution of the step (d) may be adjusted to 12 or higher.

In yet another embodiment of the present invention, a step of extracting calcium by filtering the precipitated calcium hydroxide or calcium carbonate may be further included.

In accordance with an embodiment of the present invention, the loss of lithium when extracting the impurities including magnesium, boron, and calcium contained in the lithium bearing solution can be minimized, and the extraction may be performed in a cost-effective manner without utilizing an expensive ion-exchange resin.

DETAILED DESCRIPTION OF THE INVENTION

The features of one embodiment of the present invention will be described in more detail with reference to the figures as follows.

In accordance with an embodiment of the present invention, a method of economical extraction of magnesium, boron, and calcium from a lithium bearing solution, while minimizing the loss of lithium, to produce a high purity lithium compound is provided. The method comprises the steps of absorbing boron ions contained in the lithium bearing solution to the positively charged surface of magnesium hydroxide via pH adjustment to simultaneously extract magnesium and boron, and adding an alkali or a carbonate to the filtered lithium bearing solution to precipitate calcium hydroxide from calcium.

The step (a) of the present invention involves adding an alkali selected from the group consisting of NaOH, $Ca(OH)_2$, $NH_4OH$, $R_4NOH.5H_2O$ and a mixture thereof in the lithium bearing solution to precipitate magnesium hydroxide from magnesium existing in the lithium bearing solution, wherein R is independently a C1-C10 alkyl group such as methyl, ethyl, propyl or butyl. In other words, in order to raise the pH of the lithium bearing solution, the magnesium ions existing in a dissolved state are precipitated into a magnesium hydroxide by the addition of the alkali.

The alkali includes a hydroxide negative ion. The positive ion of the alkali, which may be an environmental-friendly material, may have a very high solubility with respect to the lithium bearing solution. If the solubility of the positive ion is low, the alkali may be mixed with either the extracted magnesium or boron, which may subsequently require an additional separation process.

Further, the step (b) involves absorbing boron ions on the surface of the magnesium hydroxide by adjusting the pH of the lithium bearing solution from which the magnesium hydroxide is precipitated to about 8.5 to about 10.5.

According to one embodiment of the present invention, in order to simultaneously extract magnesium and boron from the lithium bearing solution, the surface charge of the magnesium hydroxide is utilized. In general, the surface charge of the magnesium hydroxide is greatly influenced by the pH of the solution. When the surface charge of the magnesium hydroxide is positive, the boron ions existing in the form of a negative ion, such as $H_2BO_3^-$ or $HBO_3^{2-}$ are absorbed on the magnesium hydroxide, and the magnesium and boron dissolved in the lithium bearing solution can be removed by simultaneous extraction. When the surface charge of the magnesium hydroxide is negative, however, the negatively charged boron ions are not absorbed on the magnesium hydroxide.

Figure 1:
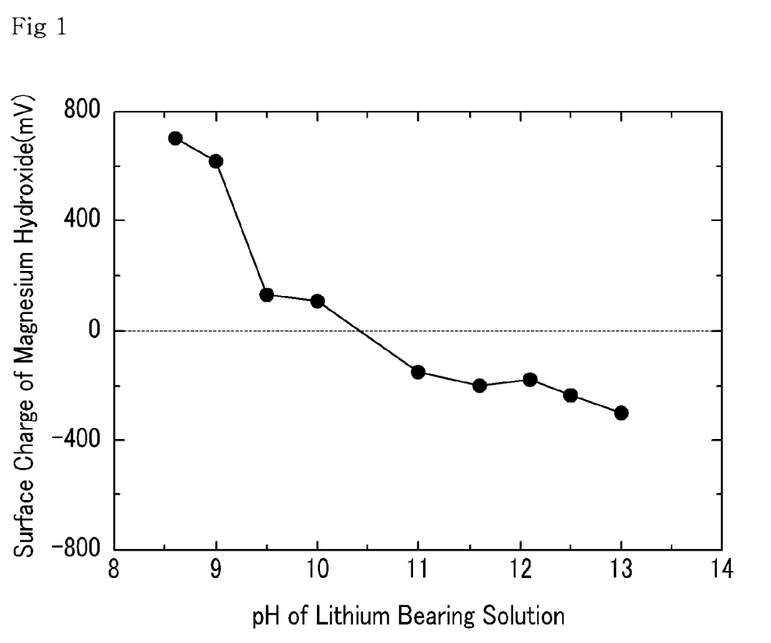
FIG. 1 is a graph depicting the surface charge change of magnesium hydroxide according to the pH of the lithium bearing solution.

It is preferable to adjust the pH of the lithium bearing solution from which the magnesium hydroxide is precipitated to about 8.5 to about 10.5. If the pH is below 8.5, the removal efficiency of magnesium will decline because a relatively low pH results in an insufficient amount of precipitated magnesium hydroxide from magnesium ions dissolved in the lithium bearing solution. On the other hand, if the pH exceeds 10.5, as seen in FIG. 1, the surface charge of magnesium hydroxide would be negatively charged, and the boron ions cannot be absorbed thereon. Consequently, the absorbance of positively charged lithium ions will lead to a substantial loss of lithium.

In order to maintain the pH level mentioned above, the alkali may be added to the lithium bearing solution in phases. In this case, the magnesium hydroxide production rate as well as pH change rate can be controlled by alkali addition.

After absorbing the boron ions on the surface of the magnesium hydroxide, the step (c) involving a simultaneous extraction of magnesium and boron by filtering the magnesium hydroxide absorbed with the boron ions from the lithium bearing solution may be performed. In other words, the filtration step is performed to separate the lithium bearing solution from the precipitated magnesium hydroxide absorbed with the boron ions. This allows the extraction of magnesium and boron, and the remaining filtrated lithium bearing solution is obtained.

It is preferable to repeatedly perform the steps (a) to (c) at least twice, more specifically two or three times, prior to performing the step (d). If the steps from (a) to (c) are performed only once to simultaneously extract the magnesium and boron, the extraction efficiency of magnesium or boron would be lower due to an excess addition of the alkali and difficulty in controlling the pH.

The step (d) involves precipitating insoluble calcium such as a calcium hydroxide or a calcium carbonate from calcium by adding an alkali or a carbonate or a mixture thereof in the lithium bearing solution from which magnesium and boron are extracted. In order to extract the most calcium ions included in the lithium bearing solution, the pH is preferably maintained to be at least 12.

Since $OH^-$ supplied from the addition of the alkali is used up in the production of calcium hydroxide, a significant amount of alkali is added in order to maintain the pH level of the lithium bearing solution to be at least 12. When the calcium carbonate is added alone or in combination with the alkali, the pH could be economically maintained at at least 12 even if the amount of alkali could be relatively reduced.

The alkali is selected from the group consisting of NaOH, $Ca(OH)_2$, $NH_4OH$, $R_4NOH.5H_2O$ and a mixture thereof, wherein R is independently a C1-C10 alkyl group such as methyl, ethyl, propyl or butyl. The carbonate is selected from the group having high solubility consisting of $Na_2CO_3$, $K_2CO_3$, and a mixture thereof. The alkali or the carbonate precipitates calcium carbonate or calcium hydroxide from calcium.

According to another embodiment of the present invention, a step of extracting calcium by filtering the precipitated calcium hydroxide or calcium carbonate may be further included. Such step can be performed according a well-known method in the art.

The present invention is further illustrated by the following examples, although the following examples relate to preferred embodiments and are not to be construed as limiting on the scope of the invention.

Example 1

NaOH was added to a lithium bearing solution containing magnesium ions 20,000 ppm, boron ions 900 ppm, calcium ions 350 ppm, and lithium ions 900 ppm to precipitate magnesium hydroxide. While adjusting the pH of the lithium bearing solution, the surface charge of the precipitated magnesium hydroxide was measured. The results are shown in FIG. 1.

As shown in FIG. 1, the surface charge of the magnesium hydroxide was maintained with a positive charge when the pH range of the lithium bearing solution from which the magnesium hydroxide was precipitated was between 8.5 and 10.5. Accordingly, the boron ions with a negative charge were easily absorbed, and the positively charged lithium ions were prevented from being absorbed. This minimized the loss of lithium, and efficiently extracted both magnesium and boron at the same time.

Example 2

Various amounts of NaOH were added to a lithium bearing solution containing magnesium ions 20,000 ppm, boron ions 900 ppm, calcium ions 350 ppm, and lithium ions 900 ppm to precipitate magnesium hydroxide. The pH of the lithium bearing solution from which the magnesium hydroxide was precipitated was altered. Subsequently, a filtration was performed to separate the precipitated magnesium hydroxide from the lithium bearing solution. The filtrate was collected to measure the amount of magnesium, boron and lithium. The results are shown in FIGS. 2, 3, and 4, respectively.

Figure 2:
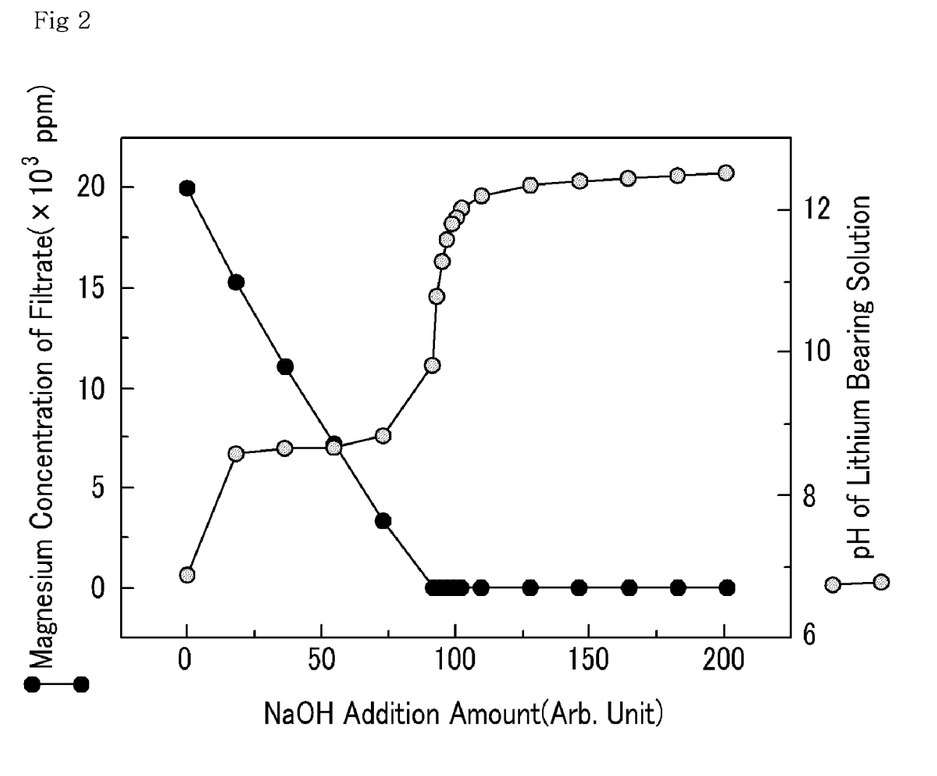
FIG. 2 is a graph depicting the concentration change of magnesium ions in the filtrate relative to the NaOH addition amount.

As shown in FIG. 2, an increase in the amount of NaOH added had no significant impact on the pH of the lithium bearing solution in the beginning, because $OH^-$ ion was used for the production of magnesium hydroxide. However, a continuous increase in the amount of NaOH gradually decreased the magnesium amount in the filtrate, and as the $OH^-$ ion increased, the amount of magnesium decreased to 4 ppm once the pH of the lithium bearing solution reached 9.8. This indicated that 99.8% of the magnesium ions dissolved in the lithium bearing solution were extracted.

Figure 3:
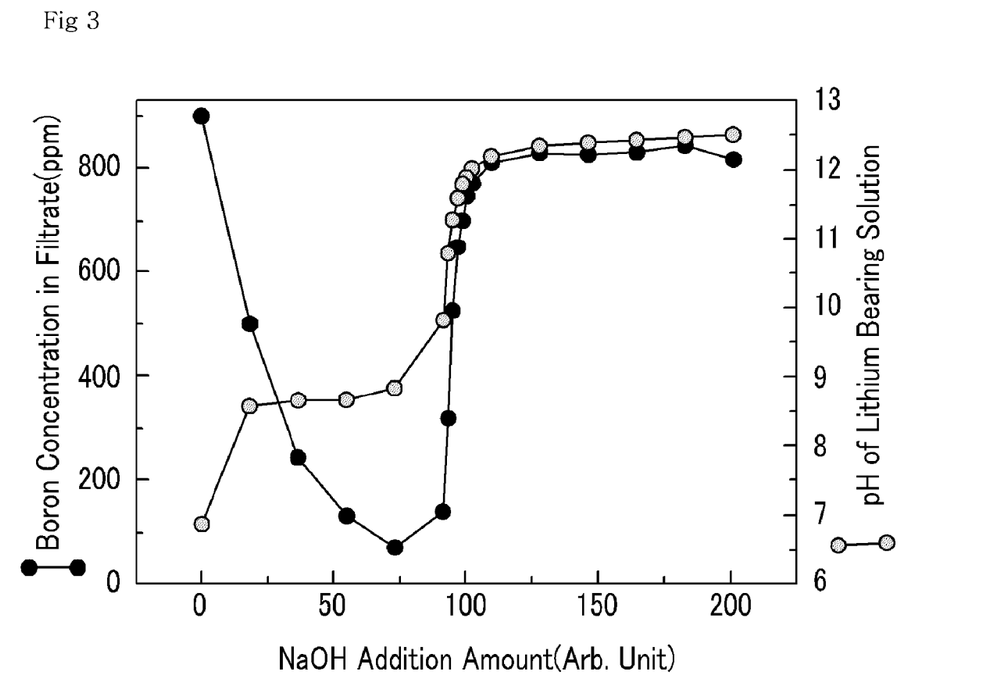
FIG. 3 is a graph depicting the concentration change of boron ions in the filtrate relative to the NaOH addition amount.

In addition, as shown in FIG. 3, the amount of boron ions dissolved in the lithium bearing solution initially decreased as the amount of NaOH added increased. This may be explained by the fact that the pH change could be insignificantly affected by the addition of NaOH in the beginning, and the surface charge of the magnesium hydroxide precipitated from the lithium bearing solution having a pH value of 10.5 or lower had a positive charge. Thus, the negatively charged boron ions present in the filtrate were precipitated while adsorbed on the surface of the magnesium hydroxide.

Figure 4:
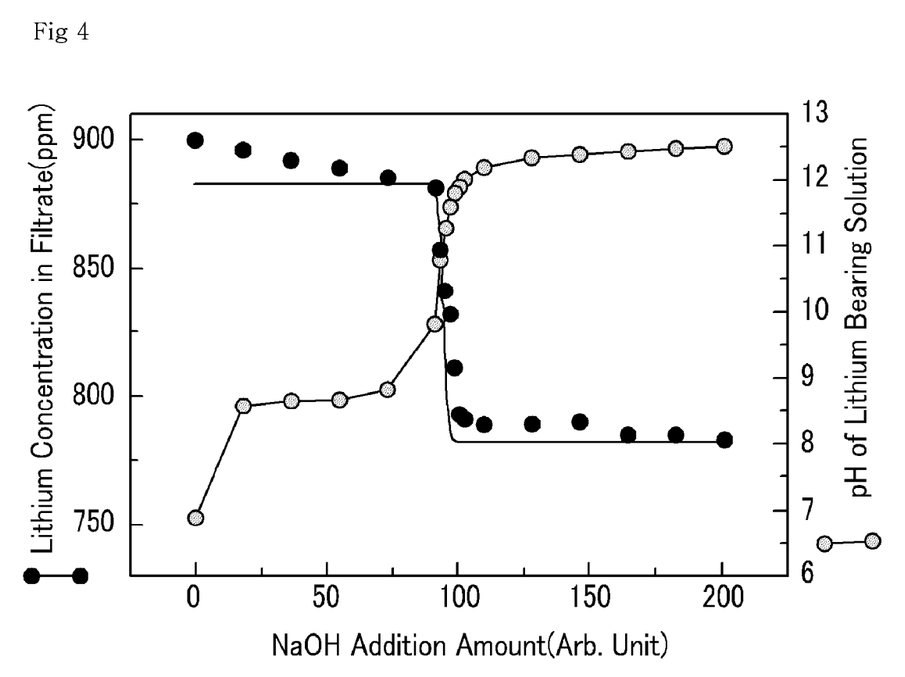
FIG. 4 is a graph depicting the concentration change of lithium ions in the filtrate relative to the NaOH addition amount.

As seen in FIG. 4, the amount of lithium ions present in the filtrate were initially not influenced by the added amount of NaOH. This could be explained by the fact that the positively charged lithium ions existing in the lithium bearing solution were not absorbed to the magnesium hydroxide because the surface charge of magnesium hydroxide had a positive charge in the beginning.

If an excessive amount of NaOH was added, however, the pH of the lithium bearing solution surpassed 10.5. Then, the surface charge of the magnesium hydroxide was converted to a negative charge and the negatively charged boron ions were not absorbed to the surface. Consequently, the concentration of boron ions existing in the filtrate dramatically increased. On the contrary, the concentration of positively charged lithium ions existing in the filtrate rapidly decreased as the lithium ions were absorbed to the surface of the magnesium hydroxide.

Accordingly, these results indicated that the added amount of alkali must be controlled to maintain the pH of the lithium bearing solution to be between 8.5 and 10.5 in order to extract magnesium and boron, while minimizing the loss of lithium from the lithium bearing solution.

Example 3

Various amounts of NaOH were added to a lithium bearing solution containing magnesium ions 20,000 ppm, boron ions 900 ppm, calcium ions 350 ppm, and lithium ions 900 ppm to precipitate calcium hydroxide from the solution containing calcium ions. A filtration was performed to separate the precipitated calcium hydroxide from the lithium bearing solution. The resulting filtrate was collected to measure the amount of calcium. The result is shown in FIG. 5.

Figure 5:
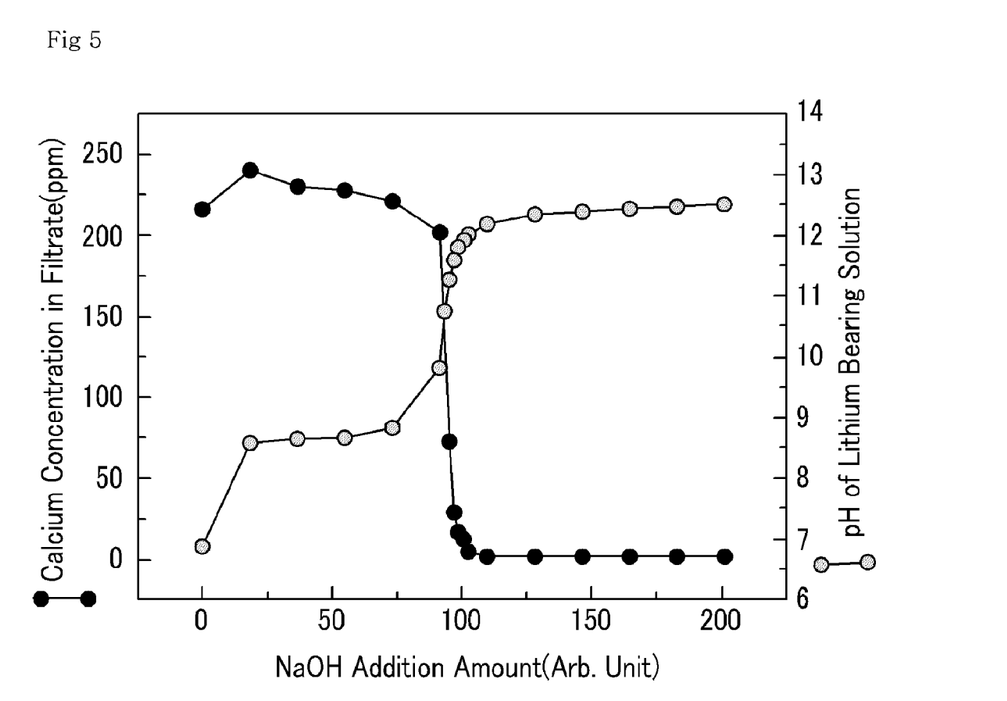
FIG. 5 is a graph depicting the concentration change of calcium ions in the filtrate relative to the NaOH addition amount.
Figure 6:
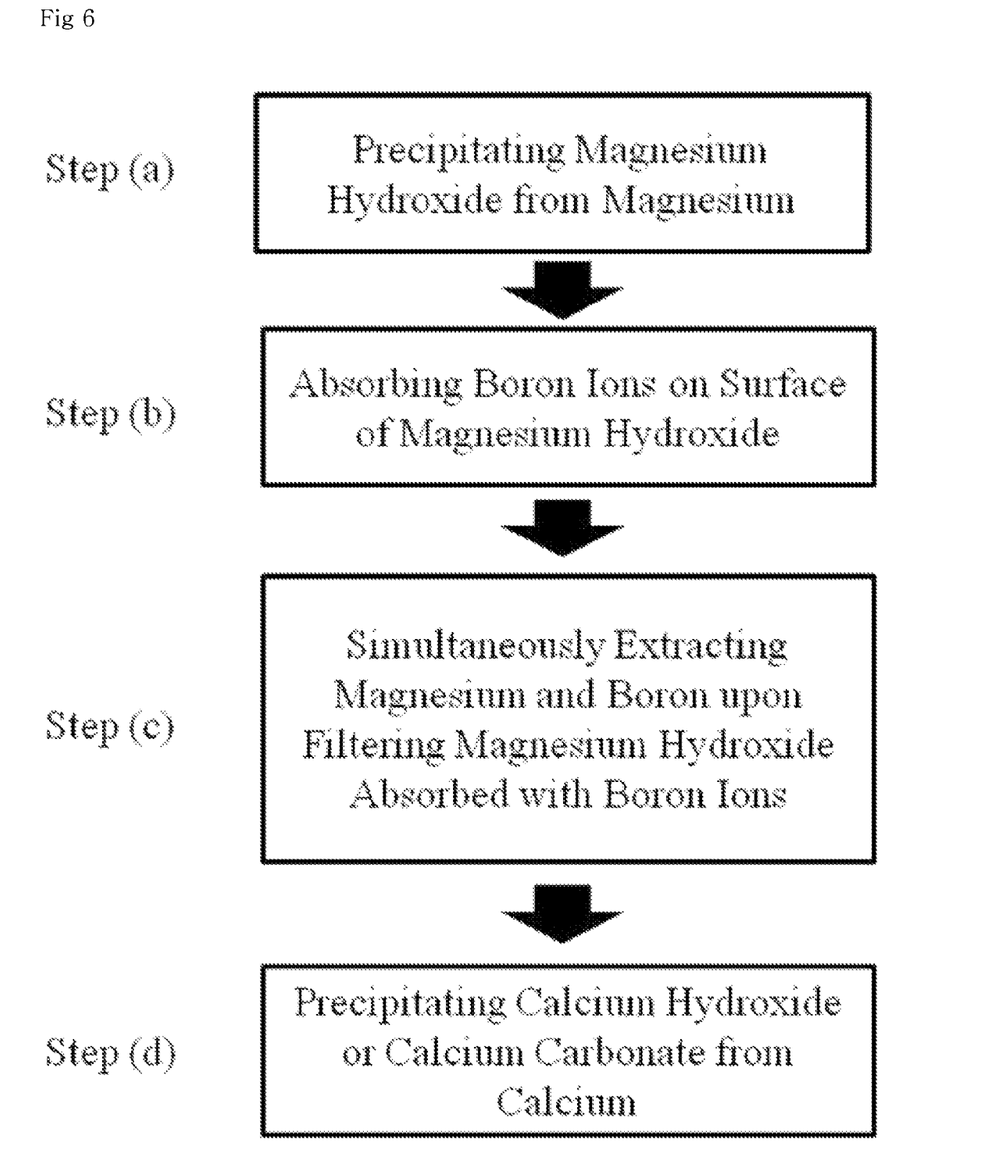
FIG. 6 relates to a flowchart showing a method of economical extraction of magnesium, boron and calcium from the lithium bearing solution according to one embodiment of the present invention.

As shown in FIG. 5, as the added amount of NaOH increased, the amount of calcium in the filtrate gradually decreased. When the pH of the lithium bearing solution reached 12, the amount of calcium was reduced to be 6.5 ppm, and 98% of the calcium ions dissolved in the lithium bearing solution was extracted. Accordingly, it is necessary to increase the pH of the lithium bearing solution to be at least 12 in order to enhance the extract yield of the calcium ions from the lithium bearing solution.

However, when the pH of the lithium bearing solution was prematurely adjusted to be at least 12 in the beginning, the surface charge of the precipitated magnesium hydroxide had a negative charge. This prevented the absorbance of the boron ions and caused the loss of lithium due to the absorbance of positively charged lithium ions. Prior to extracting calcium by adding alkali, the pH of the lithium bearing solution was adjusted to be between 8.5 and 10.5 so that the magnesium hydroxide having a positive charge was precipitated to prevent the absorbance of the lithium ions. Once the boron ions were absorbed, the simultaneous extraction of magnesium and boron was performed. Then, the pH of the lithium bearing solution from which magnesium and boron were extracted was adjusted to be at least 12 to precipitate the calcium hydroxide from the solution containing calcium ions.

Consequently, the magnesium hydroxide absorbed with the boron ions was extracted from the lithium bearing solution, and subsequently filtrated for its removal. Then, the pH of the lithium bearing solution was elevated to be at least 12 by adding an alkali or a carbonate into the remaining lithium bearing solution to extract calcium hydroxide. This allowed the preparation of a high purity lithium compound by economically extracting magnesium, boron and calcium from the lithium bearing solution.

In the foregoing specification, specific embodiments of the present invention have been described. However, one of ordinary skill in the art will appreciate that various modifications and changes can be made without departing from the spirit and scope of the present invention as set forth in the various embodiments discussed above. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements as described herein.

What is claimed is:

1. A method for extraction of magnesium, boron, and calcium from a lithium bearing solution comprising the steps of:
   (a) adding an alkali to the lithium bearing solution to precipitate magnesium hydroxide;
   (b) absorbing boron ions onto the surface of the magnesium hydroxide by adjusting the pH of the lithium bearing solution in the range of from about 8.5 to about 10.5; and
   (c) simultaneously extracting magnesium and boron by filtering the magnesium hydroxide having the absorbed boron ions from the lithium bearing solution.

2. The method of claim 1, further comprising a step (d) of precipitating calcium hydroxide or calcium carbonate by adding an alkali or a carbonate or a mixture thereof to the lithium bearing solution from which magnesium and boron are extracted.

3. The method of claim 1, wherein the steps from (a) to (c) are repeated at least twice.

4. The method of claim 1, wherein loss of lithium from the lithium bearing solution is minimized by positively charging the surface charge of the magnesium hydroxide, which allows the absorbance of boron ions having a negative charge onto the surface of magnesium hydroxide to prevent the absorbance of positively charged lithium ions.

5. The method of claim 2, wherein the alkali added to the lithium bearing solution in the step (a) or step (d) is one selected from the group consisting of NaOH, $Ca(OH)_2$, $NH_4OH$, $R_4NOH \cdot 5H_2O$ and a mixture thereof, wherein R is independently a C1-C10 alkyl group.

6. The method of claim 2, wherein the carbonate added to the lithium bearing solution in the step (d) is one selected from the group consisting of —$Na_2CO_3$—, —$K_2CO_3$—, and a mixture thereof.

7. The method of claim 2, wherein the pH of the lithium bearing solution of the step (d) is adjusted to 12 or higher.

8. The method of claim 2, further comprising a step of extracting calcium by filtering the precipitated calcium hydroxide or calcium carbonate.

* * * * *